W. WEILD.
Machine for Fluting Rollers.
No. 44,585.
Patented Oct. 4, 1864.
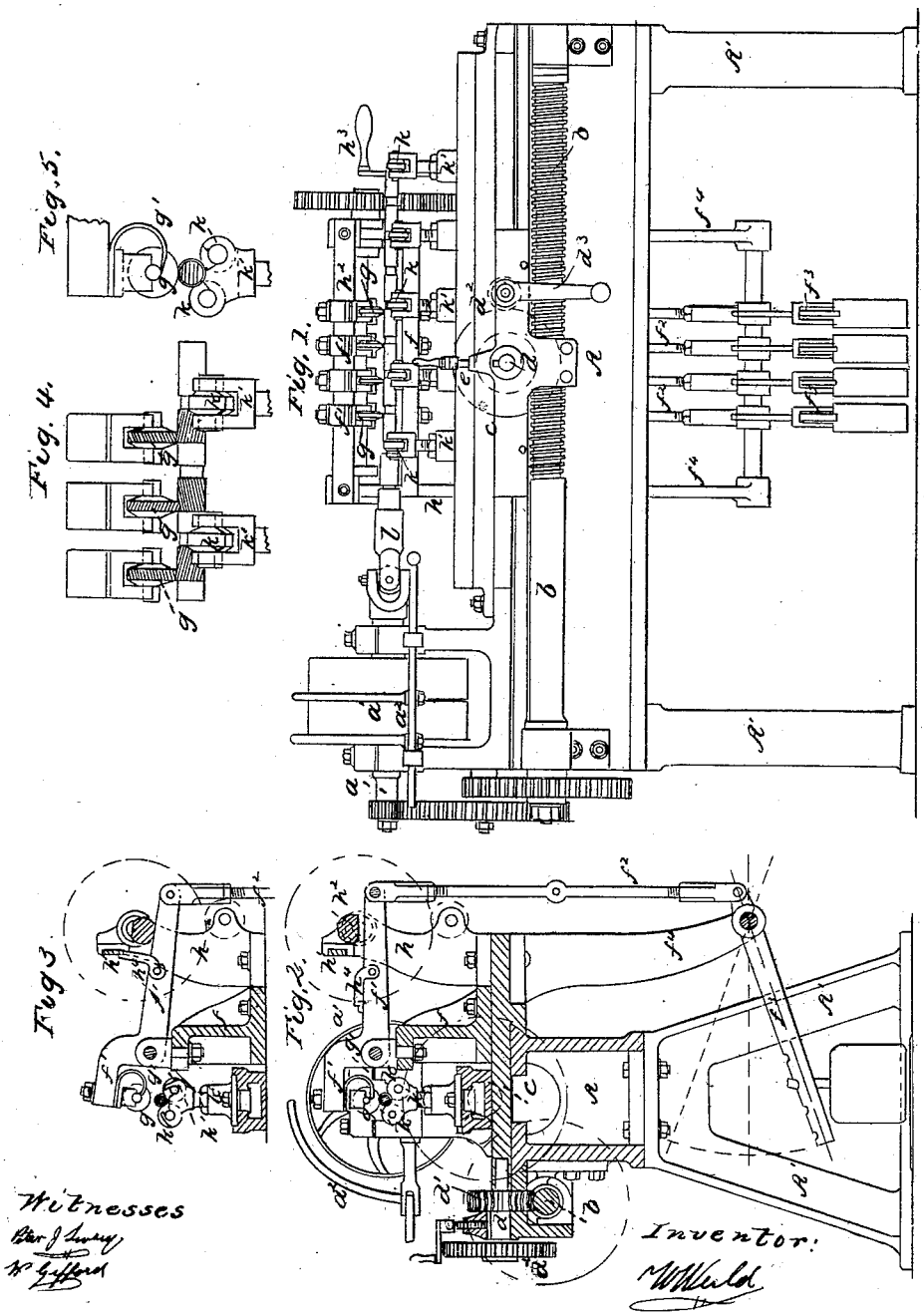

UNITED STATES PATENT OFFICE.

WILLIAM WEILD, OF MANCHESTER, COUNTY OF LANCASTER, ENGLAND.

IMPROVEMENT IN MACHINES FOR FLUTING ROLLERS.

Specification forming part of Letters Patent No. 44,585, dated October 4, 1864.

*To all whom it may concern:*

Be it known that I, WILLIAM WEILD, of the city of Manchester, in the county of Lancaster and Kingdom of Great Britain, have invented certain improvements in the manufacture of fluted rollers used in machines for preparing, spinning, and doubling cotton, wool, flax, silk, and other fibrous Materials; and I do hereby declare that the following is a full and exact description thereof, reference being had to the drawings and the letters of reference marked thereon.

Prior to the date of my invention fluted rollers, for the purposes above named, were manufactured by cutting each separate flute by a planing process, by a machine similar to a planing-machine.

My improvements in the manufacture of the said rollers consist in forming the flutes of the said rollers by a milling process, which process is applicable either for straight flutes parallel to the axis of the roller, or the improved straight or curved flutes at an inclination to the axis of the roller, for which Letters Patent of the United States have already been granted to me. An entire boss upon a roller may be covered by a milling-tool sufficiently broad, the milling-tool remaining stationary so far as end movement is concerned, but I do not recommend this mode of action. I prefer to mill straight flutes, either parallel or at an angle to the axis of the roller, by a narrow mill made to traverse across each boss of the roller.

Straight diagonal flutes may be milled upon a roller by a mill having corresponding diagonal flutes or by a mill having flutes parallel to its axis, but in this case the mill must be placed with its axis at an angle to that of the roller and not parallel to it, as in the former case. The roller to be milled is placed in a machine somewhat similar to a lathe and the mill is placed upon a slide with proper adjustments for setting it to the roller and traversing it across each boss. Several mills may be arranged upon the same slide, (say one for each boss,) and so that they may be simultaneously operated to mill each boss of the roller.

Since the date of my British patent I have made great improvements in the machinery for carrying out my said invention for manufacturing the said fluted rollers by milling, which I intend to describe herein, though I wish it to be understood that I do not make any claim by this specification for such improved machinery beyond what I may be entitled to under the specification of my aforesaid British Letters Patent.

The accompanying sheet of drawings illustrates an improved machine for carrying out my improved mode of manufacturing the said fluted rollers.

Figure 1 is a front elevation; Fig. 2, an end sectional elevation, the mills being shown in contact with the roller to be operated upon; Fig. 3, a detached view showing the mills lifted off the roller to be operated upon; Fig. 4, a front view showing the mills, roller, and supports; and Fig. 5, an end view of the same.

A is the bed of the machine; A', the feet upon which it stands; $a$, the spindle of the head-stock in suitable bearings; $a'$, fast and loose driving-pulleys; $a^2$, strap-guide; $b$, screw in bearings fixed to front of bed. This screw is geared by spur-wheels, as shown, to the end of the head stock spindle. $c$ is a slide moving lengthwise of the bed. This slide carries the supports for the roller, the milling-tools, and all the apparatus connected therewith. This slide-carriage $c$ has an axis, $d$, which has two wheels fixed upon it. One of them is a screw-wheel, $d'$, and gears with the screw-shaft $b$. The other is a spur-wheel, $d^2$, and gears with a pinion upon the axis of a handle, $d^3$, by which the axis or shaft $d$ can be turned, causing the screw-wheel $d'$ to act upon the screw $b$ as a pinion acts upon a rack, so that the slide-carriage $c$ can be moved to and fro upon the bed, even when the screw is rotating.

When the carriage $c$ is to be self-acted, the axis $d$ is made fast by means of the screw-handle $e$, which screws upon a flat piece of metal acting against the axis or shaft $d$. The screw-wheel $d'$ then acts as a nut to the screw $b$, which propels the slide-carriage $c$ along the bed. To the slide-carriage $c$ a stand, $f$, is secured, and to this stand a bearing is screwed for the fulcrum of the lever, $f'$, carrying each mill, $g$.

The mills $g$ are formed with pivots on each side, and each mill rests in a forked piece, as shown in Figs. 4 and 5. Each mill is held against its forked bearing by springs $g'$, as shown in Figs. 2, 3, and 5. One end of each lever, $f'$, is jointed to a rod, $f^2$, which is adjustable in length, as shown, the lower end of each rod being jointed with one end of a weighted lever, $f^3$, as shown, the fulcrums of the weighted levers being carried by a shaft supported in brackets $f^4$, descending from the slide-carriage $c$. Ascending from the slide-carriage are other brackets, $h$, which carry a fixed cross-bar, $h'$, and eccentric shaft, $h^2$, which can be rotated by means of the handle $h^3$, pinion, and wheel. By turning this eccentric shaft $h^2$ the levers $f'$ are simultaneously acted upon, each mill is lifted from the roller, as shown in Fig. 3, and the weights are sustained.

Any of the mills may be kept out of contact with the roller while the others are operating upon it by means of the catch $h^4$, hinged to each lever $f'$, which is brought upright and against the cross-bar $h'$, so as to prevent the lever from being forced into contact by its weighted lever.

The roller may be sustained against the pressure of the mills by plain stands acting upon that part of the rollers required to be unfluted between the bosses, but I prefer anti-friction rollers $k$, carried in stands $k'$, arranged and adjusted as will be readily understood by reference to the drawings. The roller is sustained entirely upon these stands and anti-friction rollers, as shown, motion being conveyed to it from the head-stock spindle $a$ by a universal joint, $l$, one part of it fitting the square end of the roller. By this mode of driving any little eccentricity between the roller and head-stock spindle is provided against, and the roller is thus entirely sustained by the anti-friction roller supports.

When the roller to be milled is placed in the machine the mills are lowered upon the roller at one edge of each boss. Then the mills are, by the motion of the slide-carriage, gradually traversed across each boss, completing the full depth of the flute as they pass, so that the flutes are completed by one passage of the mills.

I claim—

The milling mechanism, consisting of the milling-tools $g g g g$, weighted crank-levers $f' f'$, and eccentric shaft $h^2$, or their equivalents, in combination with the friction-rollers $k k k k$, or their equivalents, the whole being combined and used with the slide-carriage, feed mechanism, and other parts of a lathe necessary to operate them, as described, for the purposes shown.

In testimony that the foregoing is a true description of my said improvements, I have hereunto set my hand this 5th day of February, in the year of our Lord 1864.

W. WEILD.

Witnesses:
 PETER J. LIVSEY,
 W. GIFFARD.